Sept. 24, 1929.　　　F. CRUMRINE　　　1,729,504
HEAT REGULATING DEVICE
Filed July 23, 1928　　　3 Sheets-Sheet 1
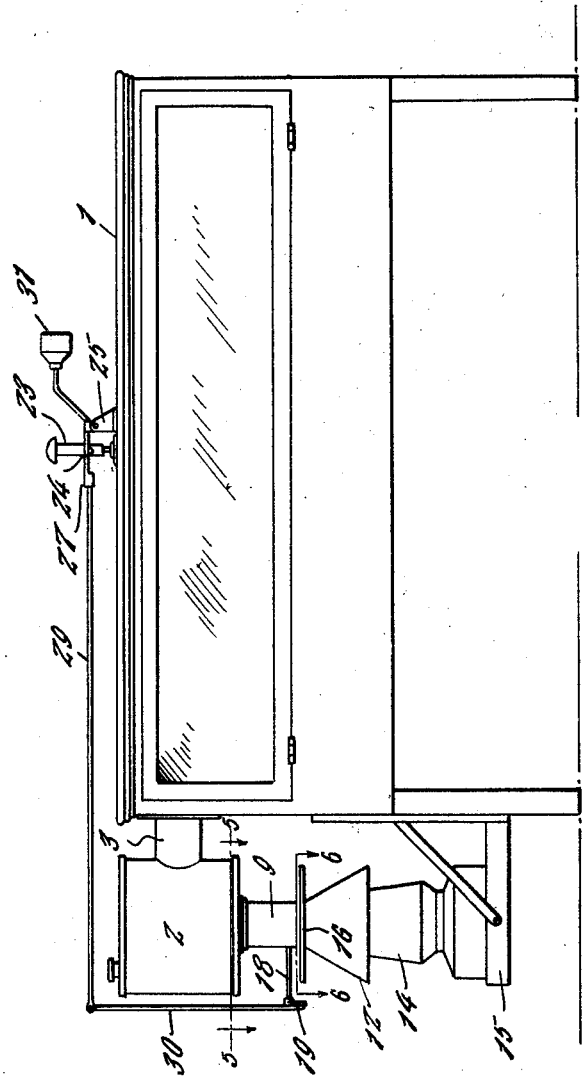
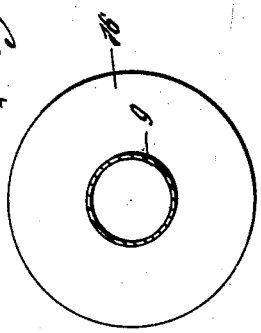
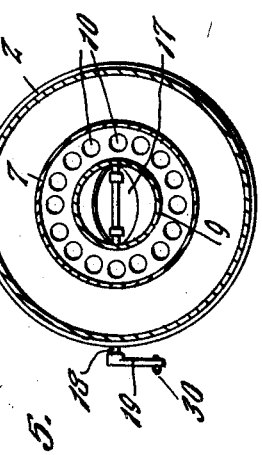
Inventor
Frank Crumrine
By Clarence A. O'Brien
Attorney Sept. 24, 1929.  F. CRUMRINE  1,729,504
HEAT REGULATING DEVICE
Filed July 23, 1928  3 Sheets-Sheet 2
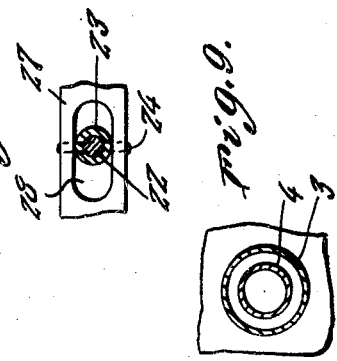
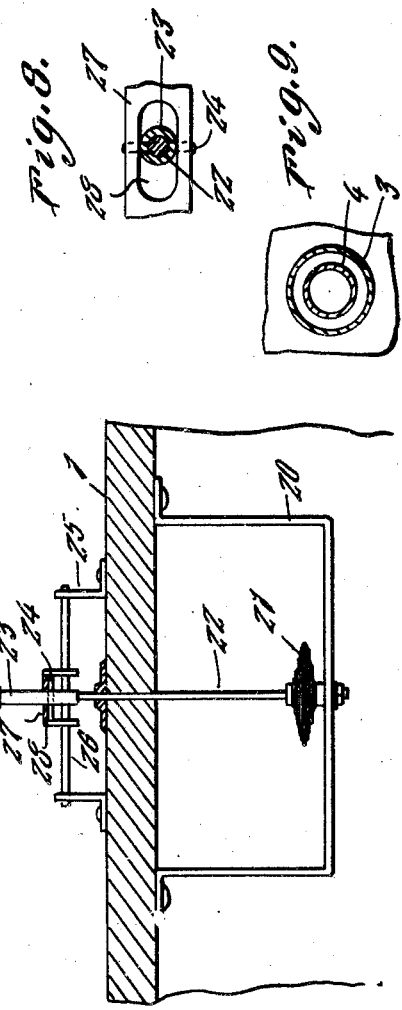
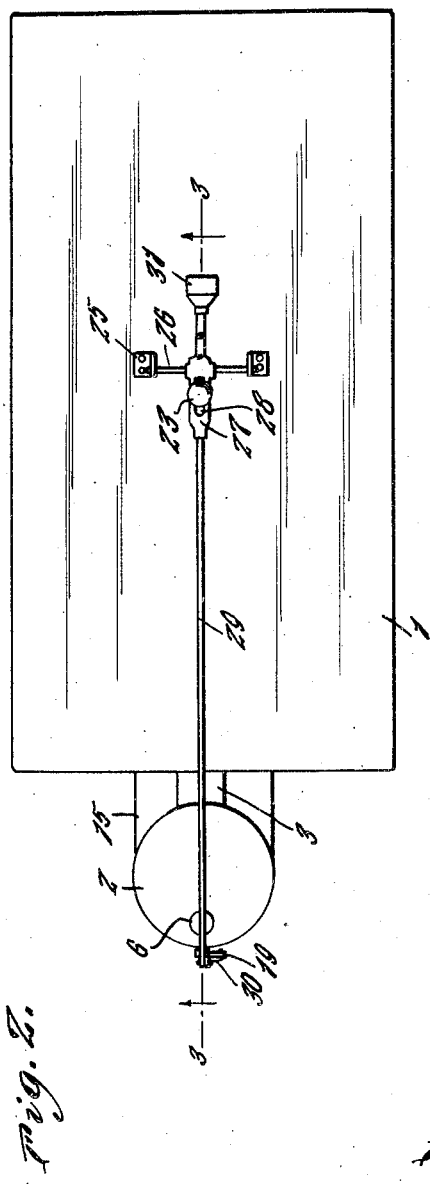
Inventor
Frank Crumrine
By Clarence A. O'Brien
Attorney Sept. 24, 1929.   F. CRUMRINE   1,729,504
HEAT REGULATING DEVICE
Filed July 23, 1928   3 Sheets-Sheet 3
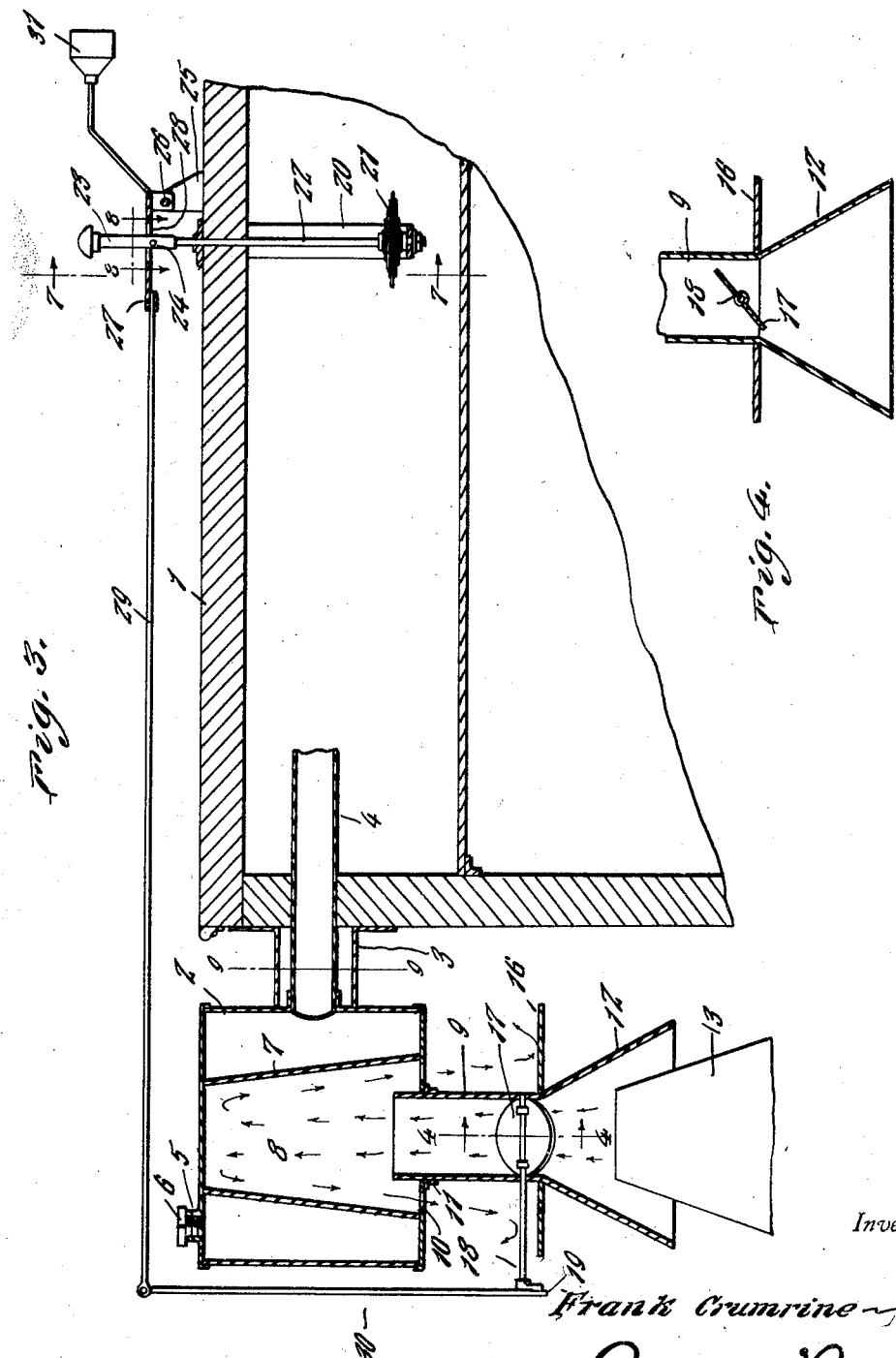

Patented Sept. 24, 1929

1,729,504

UNITED STATES PATENT OFFICE

FRANK CRUMRINE, OF BOYNTON, OKLAHOMA

HEAT-REGULATING DEVICE

Application filed July 23, 1928. Serial No. 294,901.

The present invention relates to improvements in heat regulators and has reference more particularly to a thermostatically controlled heating mechanism for association with an incubator or brooder.

One of the important objects of the present invention is to provide a heat regulator which will be entirely automatic in its operation, whereby the degree of heat supplied to the member to be heated may be controlled in a positive and efficient manner.

A further object of the invention is to provide an automatic heat regulating device, which is simple in construction, inexpensive, strong and durable, and further well adapted to the purpose for which it is designed.

Other objects and advantages of the invention will become apparent as the nature of the invention proceeds and when taken in connection with the accompanying drawings.

In the accompanying drawings, forming a part of this application and in which like reference characters designate like parts throughout the several views:

Figure 1 is a side elevation of the heat regulator embodying my invention, showing the same associated with an incubator of the conventional construction.

Figure 2 is a top plan view thereof.

Figure 3 is a longitudinal sectional view, taken approximately upon the line 3—3 of Figure 2.

Figure 4 is a sectional view taken on the line 4—4 of Figure 3.

Figure 5 is a transverse section taken on the line 5—5 of Figure 1, looking downwardly.

Figure 6 is a similar section taken upon the same figure, looking in the direction of the arrows.

Figure 7 is a vertical sectional view, taken approximately upon the line 7—7 of Figure 3, for more clearly disclosing the thermostat and the supporting means therefor.

Figure 8 is a transverse section taken on the line 8—8 of Figure 3, looking downwardly, and Figure 9 is a detail vertical sectional view, taken approximately on the line 9—9 of Figure 3.

In the drawings, wherein for the purpose of illustration is shown the preferred embodiment of my invention, the numeral 1 designates generally an incubator of the present construction, and in the present instance, the heating medium therefor comprises a cylindrical water chamber denoted by the reference character 2, that is closed at its top and bottom and is supported at one end of the incubator through the medium of the tubular bracket 3, through which extends the hot water pipe 4, that has communication with the water chamber 2 and which extends through the end of the incubator 1, in the manner as clearly shown in Figure 3, and for the purpose well known in the art.

The cylindrical water chamber 2 is formed with a filling neck 5 in the top thereof, and a removable plug 6 is threaded in this filling neck to provide a closure therefor.

Arranged within the cylindrical water chamber 2 is the frusto-conical shell 7 that extends from the top to the bottom of the casing or chamber 2 and this shell is spaced from the side wall of the water chamber, whereby to provide a centrally located hot air chamber 8, as more clearly disclosed in Figure 3.

A tubular heat conducting pipe 9 extends upwardly through the bottom of the hot air chamber 8, and formed in the bottom of the hot air chamber around the pipe 9 are the annular spaced cold air outlet openings 10 as more clearly shown in Figure 5.

An attaching flange 11 affords a means for securing the heat conducting pipe with the bottom of the casing 2, as suggested in Figure 3.

Formed on the lower end of the hot air pipe 9 is the downwardly and outwardly flaring skirt portion 12 that is adapted to be disposed over the chimney 13 of a lamp 14 that provides a source of heat, and which lamp is supported upon a suitable stand 15 arranged on the side of the incubator 1 as shown in Figure 1. The relationship of the flared skirt with respect to the lamp chimney is more clearly shown in Figure 3.

A heat deflecting collar 16 is arranged on the hot air pipe at its juncture with the skirt 12, for the purpose of deflecting surplus heat from the hot water chamber 2.

A damper 17 is arranged within the lower end portion of the hot air pipe 9 for the purpose of controlling the supply of heat therethrough and this damper is secured on the inner end portion of a transverse shaft 18. The inner end portion of this shaft is journaled in the sides of the hot air pipe 9, while the outer end of the shaft projects beyond one side of the pipe and carries at its outer end a laterally disposed arm 19, the purpose of which will be presently described.

The automatic actuating means for the shaft and the damper carried thereby will now be specifically described. A substantially U-shaped bracket denoted by the reference character 20 is secured within the heating chamber of the incubator 1 by having the upper ends of the arms directed outwardly and secured to the under side of the top of the incubator as more clearly disclosed in Figure 7 and arranged on the intermediate portion of the base or crown of this U-shaped bracket is a thermostat 21 of any conventional construction and connected at its lower end to this thermostat for movement therewith during the contraction and expansion of said thermostat is the vertically disposed rod 22 that extends upwardly through the top of the incubator and is provided on its upper end with a transverse pin carrying member 23, the transverse pin associated with this member being designated at 24.

A pair of spaced angular brackets 25 are secured on the top of the incubator 1, rearwardly of the upper end of the rod 22, and journaled in the vertical portions of the spaced brackets 25 is the cross shaft 26 on which is mounted the rear end portion of a flat strip 27, for vertical swinging movement, and the intermediate portion of this strip is provided with an enlarged opening 28 to accommodate the rod 22 and the sleeve like member 23 carried thereby, the projecting ends of the transverse pin 24 engaging with the under side of this strip in the manner as more clearly disclosed in Figure 8.

The forward end of this horizontally disposed strip 27 is fixedly connected to the rear end of the longitudinally extending lever 29 that is disposed above the incubator 1, and the forward end of this lever extends beyond the forward end of the incubator for disposition above the hot water chamber 2 and is connected at its forward end to the upper end of a vertically disposed rod 30, the lower end of which is operatively connected to the outer end of the laterally extending arm 19, as clearly disclosed in Figures 1 and 3 of the drawings.

A counter-weight 31 is connected with the pivoted end of the strip 27, as also disclosed in these particular figures of the drawings, to which reference has just been made in the foregoing paragraph.

The operation of my improved heat regulating device is though to be readily obvious from the construction disclosed and described, and therefore a further detailed description is believed unnecessary.

It will be readily obvious that when the temperature of the incubator reaches a predetermined degree, the thermostat 21 will be expanded, causing the operation of the rod 22, which will, in turn, effect the actuation of the pivoted strip 27 by reason of the pins 24 that engage therewith and this movement will result in the lever 29 operating the rod 30 to effect the actuation of the shaft 18, which, in turn, will result in the operation of the damper 17 to cut off the supply of hot air to the hot air chamber 8.

On the other hand, when the temperature falls below a predetermined degree in the incubator, the counterweight 31 will operate the lever and rod to open the damper and cause the heat to enter the chamber 8 for the purpose of heating the water in the chamber 2.

The simplicity of my heating device and regulator therefor enables the same to be readily and easily associated with an incubator, brooder or other structure, that employs either hot air or hot water as a circulating medium for heating the same, and the regulator will, at all times, be positive and efficient as well as automatic in its operation.

While I have shown the preferred embodiment of my invention, it is to be understood that various changes in the size, shape and arrangement of parts may be resorted to, without departing from the spirit of the invention or the scope of the appended claims.

I claim:

1. In combination, a hot water chamber closed at its top and bottom, a hot water circulating pipe having communication with said chamber, a hot air chamber arranged centrally within the hot water chamber, a hot air pipe extending into the bottom of the hot air chamber, the lower end of the hot air pipe providing an enlarged hot air inlet, a damper arranged within the hot air pipe, thermostatically operating means for actuating the damper, said last mentioned means including a shaft on which the damper is mounted, a laterally extending arm carried by the shaft for actuating the same, a vertically disposed rod connected at its lower end to the outer end of said arm, a lever connected at one end to the upper end of the rod for raising and lowering the same, the other end of the lever being pivoted, a vertically disposed member having means carried by the upper end portion thereof to actuate the pivoted lever, and a thermostat operatively connected with the lower end of the last mentioned rod.

2. In a heat regulator, a hot water circulating pipe having communication with the container, said container being closed at its top and bottom, a hot air chamber arranged centrally within the water container, a hot air pipe having its upper end extending into the bottom of the hot air chamber, an outwardly flared skirt formed on the lower end of the hot air pipe to provide an enlarged hot air inlet for disposition over the heater, a heat deflecting collar arranged on the hot air pipe at the juncture with said skirt, a pivoted damper arranged within the hot air pipe, and thermostatically operated means for actuating the damper.

3. In combination, an incubator or brooder provided with a heating chamber, a hot water container supported at one end of the brooder, and closed at its top and bottom, a hot water circulating pipe affording communication between the chamber and the heating chamber of the incubator or brooder, a hot air chamber arranged centrally within the hot water container, a hot air pipe having its upper end extending into the bottom of the hot air chamber, a heater supported on said end of the incubator or brooder, a flared skirt carried by the lower end of the hot air pipe for disposition over the heater to cause the heat to pass upwardly through the pipe into the hot air chamber, a heat deflecting collar arranged on the hot air pipe at the juncture of the same with said skirt, a pivoted damper arranged within the hot air pipe, a thermostat arranged within the heating chamber of the incubator or brooder, and means operatively connecting the thermostat with the damper for automatically effecting the actuation of the latter at predetermined times.

4. In combination, an incubator or brooder provided with a heating chamber, a hot water container supported at one end of the brooder, and closed at its top and bottom, a hot water circulating pipe affording communication between the container and the heating chamber of the incubator or brooder, a hot air chamber arranged centrally within the hot water container, a hot air pipe having its upper end extending into the bottom of the hot air chamber, a heater supported on said end of the incubator or brooder, a flared skirt carried by the lower end of the hot air pipe for disposition over the heater to cause the heat to pass upwardly through the pipe into the hot air chamber, a heat deflecting collar arranged on the hot air pipe at the juncture of the same with the skirt, a pivoted damper arranged within the hot air pipe, a thermostat arranged within the heating chamber of the incubator or brooder, and means operatively connecting the thermostat with the damper for automatically effecting the actuation of the latter at predetermined times, said last mentioned means including a shaft on which the damper is mounted, an arm extending laterally from said shaft, a vertically disposed rod operatively connected at its lower end to said arm, an elongated lever operatively connected at its outer end with the upper end of said rod, a vertically movable element pivoted at one end on the top of the incubator brooder and operatively connected at its other end to the inner end of the lever, an additional vertical rod connected at its lower end to the thermostat and vertically movable to the top of the incubator or brooder, and means carried by upper end of the last mentioned rod for engagement with the vertically movable element to actuate the same.

In testimony whereof I affix my signature.

FRANK CRUMRINE.